US012398704B2

(12) United States Patent
Duong et al.

(10) Patent No.: US 12,398,704 B2
(45) Date of Patent: Aug. 26, 2025

(54) THERMALLY-ENHANCED AND DEPLOYABLE STRUCTURES

(71) Applicants: Raytheon Company, Waltham, MA (US); ThermAvant Technologies, LLC, Columbia, MO (US)

(72) Inventors: Tuan L. Duong, Santa Barbara, CA (US); Adam D. Leeds, Santa Barbara, CA (US); James E. Benedict, Tewksbury, MA (US); Joseph A Boswell, San Francisco, CA (US); Daniel A. Pounds, Columbia, MO (US)

(73) Assignees: Raytheon Company, Arlington, VA (US); ThermAvant Technologies, LLC, Columbia, MO (US)

( * ) Notice: Subject to any disclaimer, the term of this patent is extended or adjusted under 35 U.S.C. 154(b) by 1596 days.

(21) Appl. No.: 16/386,968

(22) Filed: Apr. 17, 2019

(65) Prior Publication Data

US 2019/0315501 A1 Oct. 17, 2019

Related U.S. Application Data

(60) Provisional application No. 62/658,932, filed on Apr. 17, 2018.

(51) Int. Cl.
*F03G 7/06* (2006.01)
*B64G 1/50* (2006.01)
(Continued)

(52) U.S. Cl.
CPC ........... *F03G 7/0614* (2021.08); *B64G 1/503* (2013.01); *B64G 1/506* (2013.01);
(Continued)

(58) Field of Classification Search
CPC .......... B64G 1/503; B64G 1/506; B64G 1/50; B64G 1/222; F03G 7/0614;
(Continued)

(56) References Cited

U.S. PATENT DOCUMENTS 3,536,278 A    10/1970  Walley
3,733,758 A *   5/1973  Maier .................... B64G 1/443
                                                              244/172.6

(Continued)

FOREIGN PATENT DOCUMENTS

CN        1095787 C  * 12/2002  ............. B64G 1/503
CN      108791962 A  * 11/2018  ............... B64G 1/50
(Continued)

OTHER PUBLICATIONS

JP-2001263971-A English machine translation (Year: 2001).*

(Continued)

*Primary Examiner* — Jenna M Maroney

(57) ABSTRACT

An apparatus includes a structure configured to receive thermal energy and to reject the thermal energy into an external environment. The structure includes a lid and a body. The structure also includes (i) multiple inline and interconnected thermomechanical regions and (ii) one or more oscillating heat pipes embedded in at least some of the thermomechanical regions. Different portions of at least one of the lid and the body form the thermomechanical regions. The one or more oscillating heat pipes are configured to transfer the thermal energy between different ones of the thermomechanical regions. At least one of the thermomechanical regions includes one or more shape-memory materials configured to cause a shape of the structure to change. Each of the one or more oscillating heat pipes includes at least one channel in the structure.

21 Claims, 10 Drawing Sheets

(51) Int. Cl.
  *F28D 15/02* (2006.01)
  *F28D 21/00* (2006.01)
  *F28F 3/12* (2006.01)
  *F42B 15/34* (2006.01)
(52) U.S. Cl.
  CPC ............ *F28D 15/0208* (2013.01); *F28F 3/12* (2013.01); *F28D 2021/0021* (2013.01); *F28F 2255/04* (2013.01); *F42B 15/34* (2013.01)
(58) Field of Classification Search
  CPC ............ F28D 2021/0021; F28D 15/043; F28F 2255/04; F28F 13/10
  See application file for complete search history.

(56) References Cited

U.S. PATENT DOCUMENTS

| | | | |
|---|---|---|---|
| 3,903,699 | A | 9/1975 | Davis |
| 4,162,701 | A | 7/1979 | Ollendorf |
| 4,666,107 | A * | 5/1987 | Berry ................. B64G 1/222 D12/345 |
| 4,706,740 | A * | 11/1987 | Mahefkey .............. B64G 1/506 165/41 |
| 4,832,113 | A * | 5/1989 | Mims ..................... B64G 1/503 165/41 |
| 4,869,313 | A * | 9/1989 | Fredley ................. F28F 13/187 165/41 |
| 4,899,810 | A * | 2/1990 | Fredley .................... F28F 1/14 165/41 |
| 4,947,825 | A * | 8/1990 | Moriarty ............... B64G 1/506 165/104.11 |
| 5,027,892 | A * | 7/1991 | Bannon ................... B64G 1/503 244/172.6 |
| 5,036,905 | A * | 8/1991 | Eninger ................. B64G 1/506 244/172.6 |
| 5,117,901 | A * | 6/1992 | Cullimore ................ B64G 1/50 244/172.6 |
| 5,241,950 | A | 9/1993 | Mahdjuri-Sabet |
| 5,293,171 | A * | 3/1994 | Cherrette .............. H01Q 1/002 343/DIG. 2 |
| 5,697,428 | A * | 12/1997 | Akachi ............... F28D 15/0233 165/104.21 |
| 5,732,765 | A | 3/1998 | Drolen et al. |
| 5,743,325 | A * | 4/1998 | Esposto ............. F28D 15/0266 165/41 |
| 5,787,969 | A * | 8/1998 | Drolen ............... F28D 15/0266 165/41 |
| 5,794,890 | A * | 8/1998 | Jones, Jr. ............... B64G 1/503 16/280 |
| 6,080,962 | A | 6/2000 | Lee |
| 6,378,809 | B1 * | 4/2002 | Pon ........................ B64G 1/503 244/172.7 |
| 6,439,297 | B1 * | 8/2002 | Dunbar ................... B64G 1/503 244/172.6 |
| 6,511,021 | B1 * | 1/2003 | Keramidas ............. B64G 1/503 244/171.8 |
| 6,538,796 | B1 * | 3/2003 | Swanson ................ B64G 1/50 359/290 |
| 6,626,231 | B2 * | 9/2003 | Cluzet ................... F28D 15/043 244/172.6 |
| 6,899,170 | B2 | 5/2005 | Biter et al. |
| 6,997,241 | B2 | 2/2006 | Chou et al. |
| 7,028,953 | B2 * | 4/2006 | Sebata ................... B64G 1/503 244/171.8 |
| 7,080,681 | B2 | 7/2006 | Wert |
| 7,544,257 | B2 | 6/2009 | Johnson et al. |
| 7,759,664 | B2 | 7/2010 | Marks et al. |
| 8,714,492 | B2 * | 5/2014 | Goodzeit ............... B64G 1/503 244/171.8 |
| 8,864,073 | B1 | 10/2014 | Kim et al. |
| 8,919,426 | B2 * | 12/2014 | Hardesty ............ F28D 15/0233 165/104.21 |
| 8,960,608 | B2 * | 2/2015 | Goodzeit ............... B64G 1/222 244/171.8 |
| 9,091,489 | B2 * | 7/2015 | Morin ...................... F28F 1/22 |
| 9,550,584 | B1 * | 1/2017 | Harvey ................. B64G 1/222 |
| 9,889,951 | B1 * | 2/2018 | Wong ................. F28D 15/0275 |
| 10,207,824 | B2 * | 2/2019 | Lemaire ................. B64G 1/44 |
| 10,228,197 | B2 * | 3/2019 | Cognata ................. F28F 13/00 |
| 10,676,218 | B2 * | 6/2020 | Deltour ................. B64G 1/503 |
| 11,254,452 | B2 * | 2/2022 | Mena ...................... B64G 1/503 |
| 11,492,145 | B2 * | 11/2022 | Kawamura ............ B64G 1/503 |
| 2003/0051857 | A1 | 3/2003 | Cluzet et al. |
| 2005/0194122 | A1 * | 9/2005 | Wert ..................... F28D 15/025 165/104.21 |
| 2005/0211850 | A1 * | 9/2005 | Sebata .................... B64G 1/503 244/171.8 |
| 2008/0257525 | A1 * | 10/2008 | Ohnishi .................. F28F 13/00 165/41 |
| 2008/0289801 | A1 * | 11/2008 | Batty ..................... B64G 1/506 165/104.14 |
| 2009/0171294 | A1 | 7/2009 | Johnson et al. |
| 2011/0001013 | A1 * | 1/2011 | Torres Sepulveda ....................... F28D 15/043 244/171.8 |
| 2011/0023484 | A1 * | 2/2011 | Lu ............................ F03G 6/00 60/641.15 |
| 2014/0138059 | A1 * | 5/2014 | Ambrose ............... B64G 1/503 165/104.26 |
| 2014/0224939 | A1 * | 8/2014 | Wong ..................... B64G 1/503 165/104.26 |
| 2014/0299714 | A1 * | 10/2014 | Wong ...................... B64G 1/50 165/185 |
| 2017/0101197 | A1 * | 4/2017 | Thurn .................... B64G 1/503 |
| 2017/0160021 | A1 * | 6/2017 | Cognata .................... F28F 1/14 |
| 2017/0328654 | A1 * | 11/2017 | Cognata .................. F28F 13/14 |
| 2019/0308753 | A1 * | 10/2019 | Cognata ................... B64G 1/58 |
| 2019/0315500 | A1 * | 10/2019 | Duong .................. B64G 1/506 |
| 2019/0315501 | A1 * | 10/2019 | Duong .................. B64G 1/503 |
| 2020/0002026 | A1 * | 1/2020 | Duong ................ B64G 1/1078 |
| 2020/0191497 | A1 * | 6/2020 | Hulse ................. F28D 15/0208 |

FOREIGN PATENT DOCUMENTS

| | | | | |
|---|---|---|---|---|
| DE | 102015115032 A1 * | 3/2017 | | |
| EP | 0438938 A2 * | 7/1991 | | |
| EP | 780303 A1 * | 6/1997 | ............ | B64G 1/503 |
| EP | 786404 A1 * | 7/1997 | ............ | B64G 1/50 |
| EP | 0822139 A1 | 2/1998 | | |
| EP | 870677 A1 * | 10/1998 | ............ | B64G 1/50 |
| EP | 1999023 B1 * | 3/2012 | ............ | B64G 1/222 |
| EP | 2941611 A1 | 11/2015 | | |
| EP | 3239057 A1 * | 11/2017 | ............ | B64G 1/222 |
| EP | 3569508 A1 * | 11/2019 | ............ | B64G 1/44 |
| GB | 0822139 A1 * | 2/1998 | | |
| GB | 2315854 A * | 2/1998 | ............ | B64G 1/50 |
| GB | 2319360 A * | 5/1998 | ............ | B64G 1/50 |
| JP | 2001263971 A * | 9/2001 | | |
| JP | 2010216712 A | 9/2010 | | |
| WO | WO-2007109380 A2 * | 9/2007 | ............ | B64G 1/222 |
| WO | WO-2015086851 A1 * | 6/2015 | ............ | B64G 1/222 |
| WO | WO-2017203165 A1 * | 11/2017 | ............ | B64G 1/222 |

OTHER PUBLICATIONS

CN-108791962-A English Machine Translation (Year: 2018).*
International Search Report and Written Opinion of the International Searching Authority in connection with International Patent Application No. PCT/US2020/025303 dated Jul. 15, 2020, 11 pages.
International Search Report and Written Opinion of the International Searching Authority for International Patent Application No. PCT/US2019/027899 dated Jul. 15, 2019, 11 pages.
International Search Report and Written Opinion of the International Searching Authority for International Patent Application No. PCT/US2019/027700 dated Jul. 22, 2019, 11 pages.
Office Action dated Dec. 24, 2021 in connection with U.S. Appl. No. 16/385,546, 15 pages.
Office Action dated Dec. 24, 2021 in connection with U.S. Appl. No. 16/538,002, 13 pages.

(56) References Cited

OTHER PUBLICATIONS

Final Office Action dated Jun. 7, 2022 in connection with U.S. Appl. No. 16/385,546, 14 pages.
Tuan et al., U.S. Appl. No. 16/385,546 entitled "Thermally-Enhanced and Deployable Structures" filed Apr. 16, 2019, 53 pages.
Bertagne, "Variable Geometry Radiators Using Shape Memory Alloys," National Aeronautics and Space Administration, Dec. 2014, 1 page.
Blanc et al., "Solar Array Root Hinge Based on Shape Memory Alloy (SMA) Actuator," 15th European Space Mechanisms & Tribology Symposium—ESMATS 2013, Sep. 2013, 8 pages.
National Aeronautics and Space Administration, "Small Spacecraft Technology State of the Art," NASA/TP 2015 216648/REV 1, Ames Research Center, Dec. 2015, 176 pages.
EoPortal News, "SENSE (Space Environmental NanoSatellite Experiment)," Satellite Missions—eoPortal Directory, 2002, 17 pages.
Techport, "Variable Geometry Radiators Using Shape Memory Alloys," NASA Space Technology Research Grants, 2014-2016, 3 pages.
Thermal Management Technologies, "Thermally Efficient Deployable Radiators," TMT Fact Sheet, 2012, 2 pages.
Walgren et al., "Development and Testing of a Shape Memory Alloy-Driven Composite Morphing Radiator," Shape Memory and Superelasticity, Nov. 2017, 24 pages.
Tuan et al., U.S. Appl. No. 16/538,002 entitled "Integrated Thermal Energy Transport and Storage Structures" filed Aug. 12, 2019, 60 pages.
Sharar et al., "Solid-State Thermal Energy Storage Using Reversible Martensitic Transformations," Applied Physics Letters, vol. 114, Apr. 2019, 22 pages.
Final Office Action dated May 9, 2023 in connection with U.S. Appl. No. 16/385,546, 15 pages.
Non-Final Office Action dated Jan. 18, 2023 in connection with U.S. Appl. No. 16/385,546, 11 pages.

\* cited by examiner

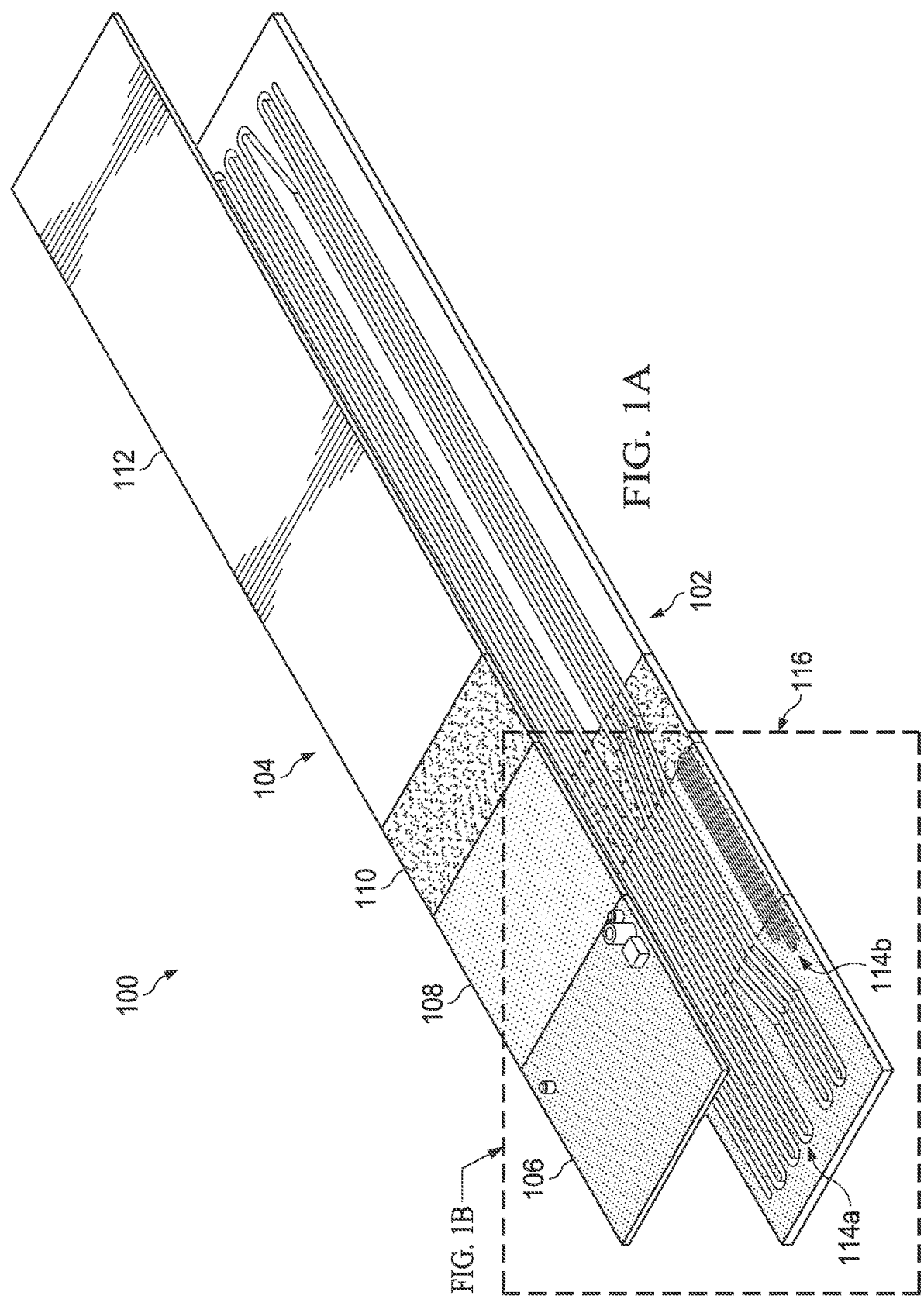

THERMALLY-ENHANCED AND DEPLOYABLE STRUCTURES

CROSS-REFERENCE TO RELATED APPLICATION(S) AND PRIORITY CLAIM

This application claims priority under 35 U.S.C. § 119(e) to U.S. Provisional Patent Application No. 62/658,932 filed on Apr. 17, 2018, which is hereby incorporated by reference in its entirety.

TECHNICAL FIELD

This disclosure is generally directed to thermal management systems. More specifically, this disclosure is directed to thermally-enhanced and deployable structures.

BACKGROUND

Various flight vehicles, such as satellites that are deployed in space, have highly-constrained size, weight, and power (SWaP) requirements. For example, the design of a satellite often must meet restrictions placed on the size, weight, and power of the satellite in order to ensure proper delivery of the satellite into a desired orbit and to ensure proper operation of the satellite once deployed. These requirements can make packaging electronics into a flight vehicle very challenging. Among other things, a system-level thermal budget identifies the maximum amount of thermal energy (heat) that can be generated by components in a flight vehicle and removed by a thermal management system of the flight vehicle. The thermal budget can therefore limit the payload carried by the flight vehicle and the power density of those electronics.

Various thermal management systems for use in flight vehicles have been proposed. Some thermal management systems support passive heat dissipation, such as by sinking waste heat into a static single wall that then functions as a radiator. Optionally, passively-deployed tape spring hinges can be used to actuate or deploy the radiator in order to increase the surface area of the radiator. Other thermal management systems actively increase the surface area of a radiator. This can be accomplished using harnessing, electronics, electrical power, actuators/motors, and high thermal conductivity interconnects. Unfortunately, these approaches tend to occupy a significant amount of space, which can reduce the amount of payload carried by a flight vehicle.

SUMMARY

This disclosure provides thermally-enhanced and deployable structures.

In a first embodiment, an apparatus includes a structure configured to receive thermal energy and to reject the thermal energy into an external environment. The structure includes a lid and a body. The structure also includes (i) multiple inline and interconnected thermomechanical regions and (ii) one or more oscillating heat pipes embedded in at least some of the thermomechanical regions. Different portions of at least one of the lid and the body form thermomechanical regions. The one or more oscillating heat pipes are configured to transfer the thermal energy between different ones of the thermomechanical regions. At least one of the thermomechanical regions includes one or more shape-memory materials configured to cause a shape of the structure to change. Each of the one or more oscillating heat pipes includes at least one channel in the structure.

In a second embodiment, a system includes a flight vehicle, one or more deployable panels, and one or more shape-changeable hinges coupled to the one or more deployable panels and the flight vehicle. Each of the one or more shape-changeable hinges includes one or more shape-memory materials configured to cause a shape of the hinge to change and one or more thermal energy transfer devices embedded in the one or more shape-memory materials. The one or more thermal energy transfer devices are configured to transfer thermal energy at least partially along a length of the hinge.

In a third embodiment, a method includes receiving thermal energy at a structure. The structure includes (i) a lid and a body, where different portions of at least one of the lid and the body form multiple inline and interconnected thermomechanical regions, and (ii) one or more oscillating heat pipes embedded in at least some of the thermomechanical regions. The method also includes transferring the thermal energy between different ones of the thermomechanical regions using the one or more oscillating heat pipes. The method further includes rejecting the thermal energy from the structure into an external environment. At least one of the thermomechanical regions includes one or more shape-memory materials configured to cause a shape of the structure to change. Each of the one or more oscillating heat pipes includes at least one channel in the structure.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 1A and 1B illustrate an example thermally-enhanced and deployable structure in accordance with this disclosure;

DETAILED DESCRIPTION

Figure 1B:
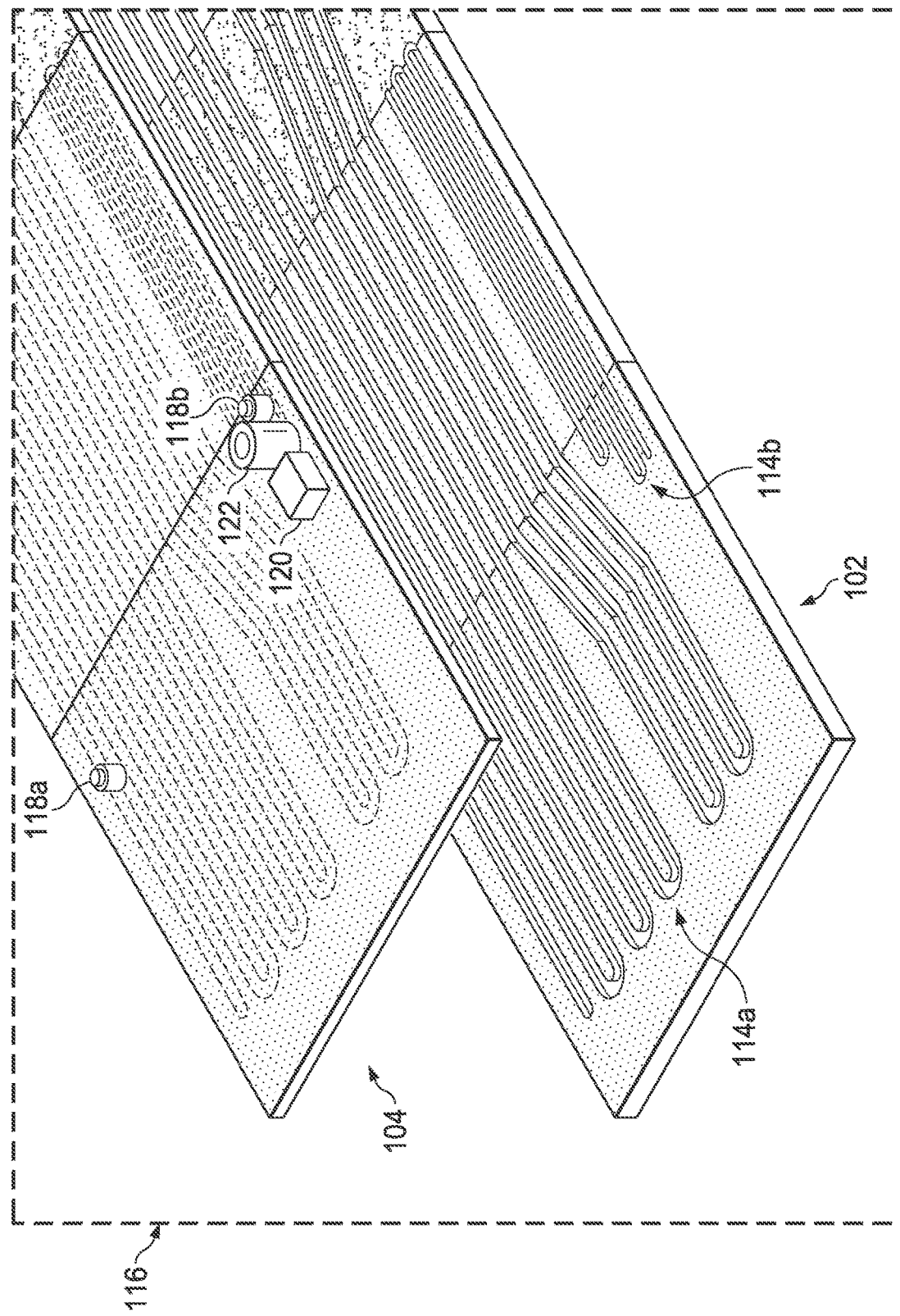

FIGS. 1A through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, flight vehicles, such as satellites deployed for use in space, often have highly-constrained size, weight, and power (SWaP) requirements. Conventional passive and actively-facilitated heat transport and heat dissipation mechanisms used in flight vehicles tend to occupy a significant amount of space within those flight vehicles. This can reduce the amount of payload carried by the flight vehicles, which can also reduce the functionality provided by the payload.

This disclosure provides various approaches that integrate one or more shape-memory alloys or other shape-memory material(s) with one or more oscillating heat pipes or other thermal energy transfer mechanism(s) in various structures. Example structures described below include structures having a body and a lid that are substantially equally thick with one or more oscillating heat pipes formed partially in the body and partially in the lid, as well as structures having hinges coupling deployable panels together. Materials like copper-aluminum-nickel (CuAlNi) alloys and nickel-titanium (NiTi) alloys exhibit properties such as a shape-memory effect and super-elasticity. The shape-memory effect generally refers to the ability of a material to be "programmed" with an initial shape, subsequently deformed, and then "self-reformed" back to its initial shape upon heating above its transformation temperature.

Shape-memory alloys (such as CuAlNi or NiTi alloys) have relatively low thermal conductivities when compared to aluminum/copper alloys and heat pipes. To help compensate for their low thermal conductivities, one or more shape-memory materials are integrated with one or more oscillating heat pipes (OHPs) or other thermal energy transfer mechanism(s) in accordance with this disclosure. An oscillating heat pipe typically represents a serpentine or other tube or passageway that transports heat through phase changes and motion of liquid slugs and vapor bubbles. Oscillating heat pipe technology enables a wide variety of structural materials to have increased thermal conductivities without requiring integrated wicks, which are often found in conventional heat pipe technologies.

For actively- and passively-deployed waste heat radiators, actuators and power and tape springs are often utilized. In the sense of heat transfer, these components enable augmented heat transfer but are often not situated directly in the thermal transfer path due to their low heat transfer capabilities. As a result, there is an inherent SWaP penalty associated with the use of these techniques. In accordance with this disclosure, the approaches described in this patent document enable multi-functionality by placing one or more actuators directly in one or more heat transfer paths of a deployable waste heat radiator. Moreover, the one or more actuators used here can represent one or more thermally-augmented shape-memory actuators, meaning the shape-memory actuator(s) can be integrated with one or more oscillating heat pipes or other thermal energy transfer mechanism(s). In some cases, the shape-memory actuator(s) can be passively activated by the same low-quality waste heat that is to be ultimately rejected. The waste heat can, for instance, come from a payload of a flight vehicle, such as a satellite, rocket, or missile. These types of approaches can decrease the SWaP in a given system since the heat dissipation mechanisms are passive and do not rely on external mechanisms, supplemental power, and electronics for deployment. This also presents a simplified approach for enabling passively-deployable structural members. However, it is also possible to use active mechanisms with the deployable structural members.

In some embodiments of this disclosure, plates of at least one shape-memory alloy or other shape-memory material(s) (such as CuAlNi or NiTi) are programmed into an appropriate deployed position, such as by employing standard shape-memory material processing techniques. The plates are then deformed as necessary or used in their current form during OHP manufacturing as structural members, which will be used to confine a working fluid in one or more oscillating heat pipes for proper operation. This forms a deployable radiator that can be integrated into a larger system. At system-level integration, the deployable radiator can be deformed into a stowed position prior to launch or other use. In some embodiments, after launch (such as subsequent to orbital insertion for a satellite), waste heat generated from electronics during initial system startup or at other times supplies the needed heat for OHP operation. The heat energy is absorbed by the shape-memory plates, and the radiator returns to its original programmed state. During system runtime, the deployable radiator continues to reject waste heat generated by the electronics for its intended lifetime. As noted in this document, however, other heat (including from one or more active sources) can be used with the deployable radiator.

In other embodiments, hinges that include at least one shape-memory alloy or other shape-memory material(s) (such as CuAlNi or NiTi) can couple adjacent panels to be deployed from a larger structure (such as a satellite). The hinges can be passively activated (such as by using waste heat) or actively activated to change shape and deploy the panels. The hinges can also incorporate one or more oscillating heat pipes or other thermal energy transfer mechanism(s) to enable the transfer of thermal energy between various panels. The hinges can be programmed into an appropriate deployed position, such as by employing standard shape-memory material processing techniques, and the hinges can then be deformed as necessary.

The approaches described in this patent document therefore allow the integration of one or more shape-memory alloys or other shape-memory material(s) with one or more oscillating heat pipes or other thermal energy transfer mechanism(s) to create passively-deployable or actively-deployable waste heat radiators, deployable panels, or other deployable structures for satellite applications or other applications. Various novels aspects of these approaches include:

combining one or more shape-memory alloys or other shape-memory material(s) with one or more oscillating heat pipes or other thermal energy transfer mechanism(s) to increase the thermal conductivity of the shape-memory material(s);

utilizing passive or active activation of a shape-memory system in a deployable waste heat radiator system or deployable panel satellite system;

utilizing waste heat directly from payload electronics or other source(s) to do meaningful work, since OHP technology or other thermal energy transfer technology can enable long-range communication of heat from electronics or other sources to areas of interest; and achieving SWaP savings due to placing each actuator in line with a heat transfer path to a heat radiator or deployable panel.

Additional details of example embodiments of these approaches are provided below. It should be noted that these details relate to specific implementations of devices and systems that utilize these approaches and that other implementations of devices and systems can vary as needed or desired. For example, while the description below may use specific examples of materials to form one or more deployable waste heat radiators or shape-changeable hinges, other suitable materials can be used. As another example, while the description below may describe specific uses of one or more deployable waste heat radiators or shape-changeable hinges, the deployable waste heat radiators or shape-changeable hinges can be used in any other suitable applications. It should also be noted here that while often described as integrating one or more shape-memory materials with one or more oscillating heat pipes or other thermal energy transfer mechanisms, one or more non-shape-memory materials can also be used in a deployable radiator, shape-changeable hinge, or other structure along with the one or more shape-memory materials. Thus, for instance, at least one portion of a deployable radiator, shape-changeable hinge, or other structure can be formed using one or more shape-memory materials, and at least one other portion of the deployable radiator, shape-changeable hinge, or other structure can be formed using one or more non-shape-memory materials.

FIGS. 1A and 1B illustrate an example thermally-enhanced and deployable structure 100 in accordance with this disclosure. The structure 100 here is generally configured to receive and radiate thermal energy. As shown in FIGS. 1A and 1B, the structure 100 includes a body 102 and a lid 104. The lid 104 can be secured to the body 102 in order to form a completed structure 100. Any suitable techniques can be used to secure the lid 104 to the body 102, such as laser welding, brazing, friction stir welding, ultrasonic welding, diffusion bonding, or other techniques. A seal is formed between the body 102 and the lid 104 in order to prevent a working fluid in the structure 100 from leaking during operation.

Figure 2A:
FIGS. 2A through 2D illustrate example cross-sections of a thermally-enhanced and deployable structure in accordance with this disclosure.

In this example, the body 102 and the lid 104 each includes a number of distinct inline and interconnected thermomechanical regions 106-112. FIG. 2A illustrates an example cross-section of the body 102 and the lid 104 having these thermomechanical regions 106-112. Each of the thermomechanical regions 106-112 represents a portion of the structure 100 that is used to perform at least one specific function. For example, the structure 100 includes one or more heat input regions 106, which are configured to receive thermal energy to be radiated by the structure 100. The structure 100 also includes one or more morphable regions 108, which are configured to change shape in order to change an overall shape of the structure 100 while also being configured to transport thermal energy to or from other regions of the structure 100. The structure 100 further includes one or more adiabatic regions 110, which are configured to provide structural support for the structure 100 while also being configured to transport thermal energy to or from other regions of the structure 100. The term "adiabatic" refers to the characteristic or capability of transferring thermal energy while substantially or completely preventing heat transfer to and from an external environment. In other words, the adiabatic region(s) 110 can transport thermal energy to or from other regions of the structure 100 without leaking the thermal energy into the external environment and without gaining thermal energy from the external environment (at least to a significant extent). In addition, the structure 100 includes one or more heat rejection regions 112, which are configured to receive thermal energy from other regions of the structure 100 and to radiate the thermal energy from the structure 100. In this example, the one or more morphable regions 108 are located between the one or more heat input regions 106 and the one or more heat rejection regions 112. Also, in this example, the one or more adiabatic regions 110 are located between the one or more heat input regions 106 and the one or more heat rejection regions 112.

It should be noted here that one or more of these thermomechanical regions 106-112 may be optional and can be omitted from the structure 100. For example, the one or more adiabatic regions 110 may be omitted if the other thermomechanical regions 106, 108, 112 do not require structural support, reinforcement, or extended heat transport using any adiabatic regions. It should also be noted here that the order or positioning of the thermomechanical regions 106-112 can vary as needed or desired. For instance, an adiabatic region 110 can be positioned between a heat input region 106 and a morphable region 108, or the morphable region 108 can be positioned elsewhere in the structure 100. Also, multiple heat input regions 106, multiple morphable regions 108, multiple adiabatic regions 110, and/or multiple heat rejection regions 112 may be used in the structure 100 in any suitable arrangement.

Each of the thermomechanical regions 106-112 can be formed from any suitable material(s). For example, each morphable region 108 may be formed from one or more shape-memory alloys or other shape-memory material(s). Any suitable shape-memory material or materials may be used here, such as a CuAlNi or NiTi alloy. In some embodiments, multiple (and possibly all) of the thermomechanical regions 106-112 may be formed from one or more shape-memory materials. In these embodiments, the morphable region 108 can implement or assume the roles of one or more of the thermomechanical regions 106, 110, and 112. In other embodiments, only the morphable region 108 is formed from one or more shape-memory materials, and the thermomechanical regions 106, 110, and 112 can be formed from other suitable material(s). For instance, the thermomechanical regions 106, 110, and 112 may be formed from titanium, aluminum, copper, or other metal(s) or material(s) having high thermal conductivity. In particular embodiments, the heat rejection region(s) 112 of the structure 100 may be coated with a suitable material, such as silver fluorinated ethylene propylene (TEFLON), to increase the efficiency of the heat rejection region(s) 112 in radiating thermal energy as emitted radiation. Also, in particular embodiments, the adiabatic region(s) 110 may be coated with a low-emissivity coating or insulator or a multi-layer insulation (MLI) to help reduce or prevent heat loss or heat gain through the adiabatic region(s) 110. For space applications, for instance, an insulator may be painted or otherwise deposited onto the adiabatic region(s) 110, or an MLI blanket can be constructed using multiple layers of aluminized polyimide film (such as KAPTON) with a polyethylene terephthalate mesh (such as DACRON) or other plastic separating each of the layers and attached to a substrate in any number of ways (such as by using rivets, buttons, dual locks, or tape).

Each of the body 102 and the lid 104 can have any suitable size, shape, and dimensions. For example, the lid 104 may have the same shape as the body 102 and have a substantially equal thickness compared to a thickness of the body 102 (although this need not be the case). Also, the structure 100 may have any suitable shapes in its pre-deployment and post-deployment states, such as the shapes shown in FIGS. 3A and 3B, which are described below.

As shown here, the structure 100 also includes one or more thermal energy transfer devices. In this example, an oscillating heat pipe core is used to implement the thermal energy transfer device(s), where the core includes one or more oscillating heat pipe circuits 114a-114b. Each oscillating heat pipe circuit 114a-114b represents a passageway through which liquid and vapor can move. In some embodiments, a working fluid in the passageway can exist in liquid form until adequately heated, such as by thermal energy received through one or more heat input regions 106. Fluid in vapor form in the passageway can later re-enter the liquid form when the vapor is cooled, such as when thermal energy is removed from the vapor by one or more heat rejection regions 112. Thus, thermal energy can be transported through the structure 100 using phase changes and motion of liquid slugs and vapor bubbles in each oscillating heat pipe circuit 114a-114b.

In this particular example, there are two oscillating heat pipe circuits 114a-114b. A portion 116 of the structure 100 in FIG. 1A is shown in an enlarged view in FIG. 1B. As can be seen here, the oscillating heat pipe circuit 114a generally includes one or more larger fluid passageways formed using wider turns, while the oscillating heat pipe circuit 114b generally includes one or more smaller fluid passageways formed using smaller turns. Also, the oscillating heat pipe circuit 114a here extends across substantially all of the thermomechanical regions 106-112 of the body 102, while the oscillating heat pipe circuit 114b here extends across the thermomechanical region 108 and partially into the thermomechanical regions 106 and 110. Note, however, that these two implementations of the oscillating heat pipe circuits 114a-114b are for illustration only.

Figure 2B:
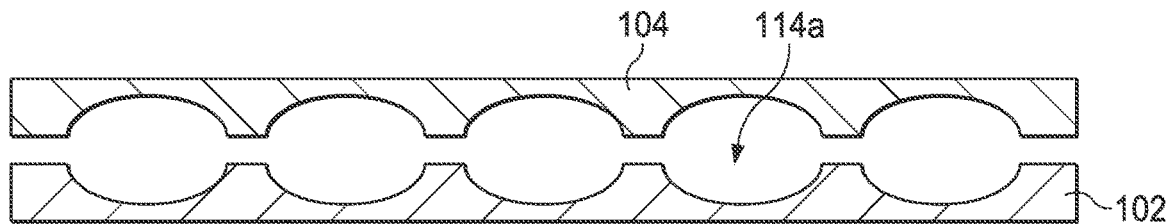

Each of the oscillating heat pipe circuits 114a-114b is formed partially in the body 102 and partially in the lid 104. When the lid 104 is joined to the body 102, these portions collectively form the oscillating heat pipe circuits 114a-114b. As shown in FIGS. 2A and 2B, the thickness of the body 102 (as measured from top to bottom) can be substantially equal to the thickness of the lid 104 (as measured from top to bottom). Also, approximately half of each oscillating heat pipe circuit 114a-114b can be formed in the body 102, and approximately half of each oscillating heat pipe circuit 114a-114b can be formed in the lid 104. In this way, the OHP core can be situated or formed symmetrically across a bond line interface 202, which represents the interface along which the lid 104 is connected to the body 102. A neutral axis 204 is defined by the vertical positioning of the OHP core in the structure 100, and the bond line interface 202 can be placed along or aligned with the neutral axis 204. Positioning the oscillating heat pipe circuits 114a-114b in this manner can help to decrease or minimize stresses along the bond line interface between the body 102 and the lid 104.

Each oscillating heat pipe circuit 114a-114b has an associated charging port 118a-118b, which allows fluid to be injected into that oscillating heat pipe circuit 114a-114b after the lid 104 has been secured to the body 102. In some embodiments, each charging port 118a-118b is welded or otherwise secured to the structure 100 and can be closed or otherwise sealed after fluid is injected into the associated oscillating heat pipe circuit 114a-114b. Alternatively, if it is possible to include fluid in the oscillating heat pipe circuits 114a-114b during fabrication of the structure 100, the charging ports 118a-118b may potentially be omitted here.

In the specific arrangement shown here, the oscillating heat pipe circuit 114a can be used to transport thermal energy to be rejected through the structure 100 from one or more heat input regions 106 to one or more heat rejection regions 112. The oscillating heat pipe circuit 114b can be used to transport thermal energy from a heater 120 or a feed port 122 at least partially through the morphable region(s) 108. The heater 120 represents a resistive heater or other circuit or device configured to generate thermal energy. The feed port 122 represents a fiber optic port or other port configured to receive thermal energy from an external source. In either case, the thermal energy from the heater 120 or feed port 122 is provided into one or more morphable regions 108, allowing the morphable region(s) 108 to change shape. This supports active deployment of the structure 100. If the morphable regions 108 are to be triggered using incident or reflected radiation, focused radiation can be provided to the feed port 122. The radiation received at the feed port 122 can be provided by any suitable source(s), such as one or more lasers, light emitting diodes (LEDs), or solar collectors. While the heater 120 and feed port 122 are shown here as residing on a heat input region 106 of the lid 104, each of the heater 120 and the feed port 122 may be located at any other suitable position on the lid 104 or the body 102. Also, the structure 100 does not need to include both the heater 120 and the feed port 122.

Note that the use of active heating of the morphable region(s) 108 is not required and that the morphable region(s) 108 can change shape in any other suitable manner. For instance, the morphable region(s) 108 can change shape based on thermal energy being transported through the oscillating heat pipe circuit 114a. Thus, the heater 120 and the feed port 122 (along with the oscillating heat pipe circuit 114b) may be omitted here. Also, even when a heater 120 and/or a feed port 122 is used, the oscillating heat pipe circuit 114a may be used to transport thermal energy, so the oscillating heat pipe circuit 114b may be omitted. In general, one or more morphable regions 108 of the structure 100 may change shape based on any suitable passive or active heating of the morphable region(s) 108. Moreover, the structure 100 may include any suitable number and arrangement of oscillating heat pipe circuit(s), and the oscillating heat pipe circuit(s) may be used to transport thermal energy in any suitable manner between any desired locations of the structure 100. Thus, the structure 100 can include one or more oscillating heat pipe circuits of any suitable sizes, densities, and heat transfer capabilities.

Also note that there is no requirement for both the body 102 and the lid 104 to include all four types of thermomechanical regions 106-112. In some embodiments, for example, the lid 104 may include only the morphable region 108. In those embodiments, the morphable regions 108 of the body 102 and the lid 104 may have a combined thickness that matches or approximately matches the thickness of other regions 106, 110, 112 of the body 102 (although this need not be the case).

Each of the body 102, the lid 104, and the thermomechanical regions 106-112 can be formed in any suitable manner. For example, each of the thermomechanical regions 106-112 of the body 102 and/or lid 104 may be formed separately and connected together, or some/all of the thermomechanical regions 106-112 of the body 102 and/or lid 104 may be formed as an integral structure. If separate portions of the body 102 and/or lid 104 are formed, those portions may be joined together in any suitable manner, such as via the use of butt joints or other joints that can be formed through laser welding, brazing, friction stir welding, ultrasonic welding, or other suitable techniques. One or more oscillating heat pipe circuits 114a-114b can also be formed in any suitable manner, such as by using photochemical machining, computer numerical control (CNC) milling, additive manufacturing, or other suitable techniques.

It should be noted here that while the use of one or more oscillating heat pipe circuits 114a-114b is shown in FIGS. 1A and 1B, any other or additional suitable thermal energy transfer device(s) may be used in the structure 100. For instance, other phase-change heat transfer devices may be used, where a phase-change heat transfer device represents a device that transfers thermal energy through phase changes in one or more working fluids. Specific examples include other types of heat pipes and vapor chambers. As another example, the thermal energy transfer device(s) may be implemented using one or more highly-thermally conductive materials, such as graphite. As yet another example, the thermal energy transfer device(s) may be implemented using one or more fluid flows, each of which may represent a non-phase-change fluid that transfers thermal energy.

FIGS. 2A through 2D illustrate example cross-sections of a thermally-enhanced and deployable structure in accordance with this disclosure. In particular, FIGS. 2A and 2B illustrate example cross-sections of the structure 100 shown in FIGS. 1A and 1B. FIG. 2A shows a cross-section of the structure 100 taken along the length of the structure 100, while FIG. 2B shows a cross-section of a portion of the structure 100 taken across the width of the structure 100 where at least part of the oscillating heat pipe circuit 114a is located. As shown in FIG. 2B, the body 102 and lid 104 can each include approximately half of the oscillating heat pipe circuit 114a, and a bond line interface between the body 102 and the lid 104 can be aligned with a neutral axis of the structure 100.

Figure 2C:
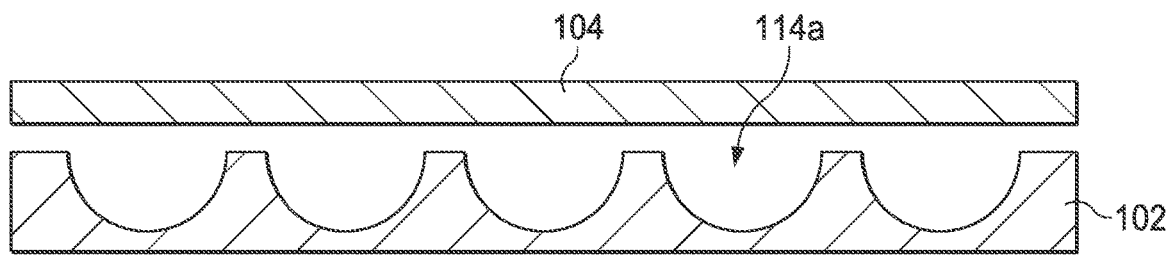
Figure 2D:
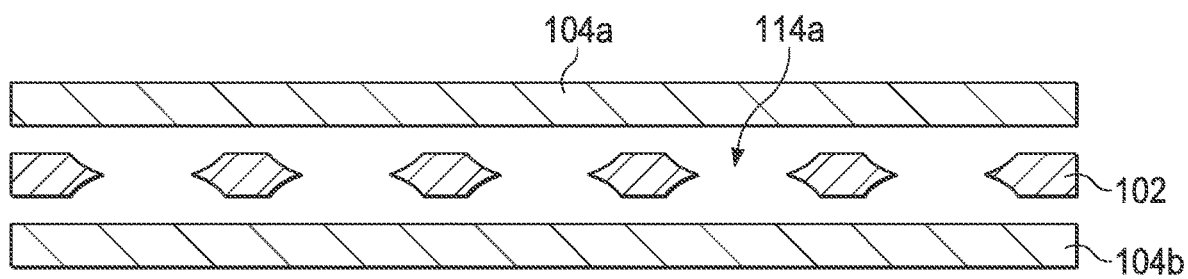

FIGS. 2C and 2D illustrate other example cross-sections of a thermally-enhanced and deployable structure, which may be used in the structure 100 of FIGS. 1A and 1B. In FIG. 2C, the oscillating heat pipe circuit 114a may be formed in the body 102, and the lid 104 can be secured to the body 102 over the oscillating heat pipe circuit 114a. In FIG. 2D, the oscillating heat pipe circuit 114a may be formed completely through the body 102, and two lids 104a-104b can be secured to opposite sides of the body 102 under and over the oscillating heat pipe circuit 114a.

Although FIGS. 1A and 1B illustrate one example of a thermally-enhanced and deployable structure 100 and FIGS. 2A through 2D illustrate examples of cross-sections of the structure 100, various changes may be made to FIGS. 1A through 2D. For example, the shape(s) of the overall structure 100 can vary as needed or desired. Also, the relative sizes and shapes of the components of the structure 100 are for illustration only and can vary as needed or desired. In addition, any other suitable cross-section(s) can be used for one or more oscillating heat pipe circuits in the structure 100.

Figure 3A:
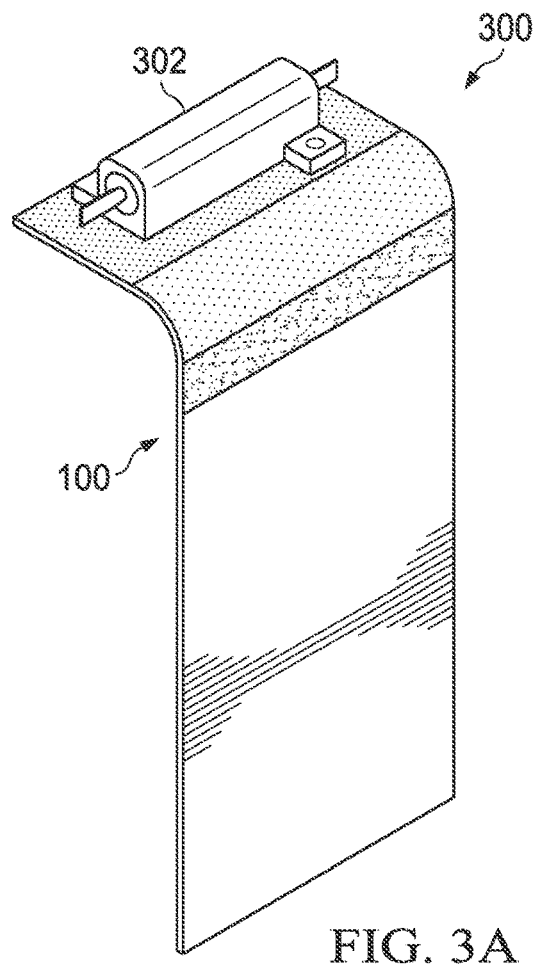
FIGS. 3A and 3B illustrate example shapes of the thermally-enhanced and deployable structure shown in FIGS. 1A and 1B in accordance with this disclosure.
Figure 3B:
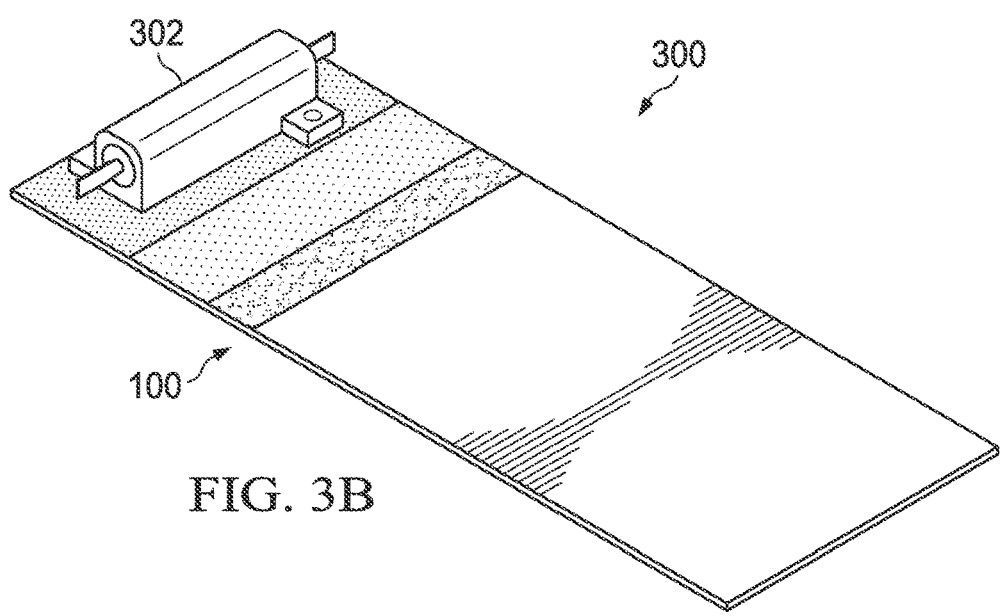

FIGS. 3A and 3B illustrate example shapes of the thermally-enhanced and deployable structure 100 shown in FIGS. 1A and 1B in accordance with this disclosure. In particular, FIG. 3A illustrates an example stowed or pre-deployment shape of the structure 100, and FIG. 3B illustrates an example deployed or post-deployment shape of the structure 100. It should be noted, however, that the structure 100 may have any other suitable pre-deployment and post-deployment shapes as needed or desired.

In this example, at least one heat source 302 is mounted on the heat input region 106 of the structure 100, which allows thermal energy from the heat source 302 to be provided directly to the structure 100. However, this direct mounting of at least one heat source 302 on the structure 100 is not required, and thermal energy from at least one heat source 302 can be provided to the structure 100 in any suitable manner. Each heat source 302 represents any suitable structure configured to generate thermal energy to be removed or rejected using the structure 100. For instance, a heat source 302 can represent electrical circuitry, one or more electronic devices, one or more power supplies, or other component(s) of a satellite, missile, rocket, or other flight vehicle that can generate heat during operation.

In FIG. 3A, the morphable region 108 is shown as having a first state in which the morphable region 108 is generally curved or folded. In FIG. 3B, the morphable region 108 is shown as having a second state in which the morphable region 108 is generally straight. The transition of the structure 100 from the first state shown in FIG. 3A to the second state shown in FIG. 3B occurs in response to heating of the morphable region 108, which causes the shape-memory material(s) of the morphable region 108 to change shape. This allows the structure 100 to be deformed so that the structure 100 has a stowed position prior to deployment of a flight vehicle. Once deployed, heating of the morphable region 108 can occur, causing the structure 100 to deploy and achieve a desired shape more suitable for use in radiating thermal energy.

The first state of the structure 100 can be obtained when the shape-memory material(s) forming at least the morphable region 108 is in an unstrained "martensite phase" and is subsequently deformed to a reversible "strained" condition while remaining in the "martensite phase." The deformation can be accomplished in any suitable manner, such as by induced out-of-plane mechanical bending deformation up to a maximum material-specific reversible strain. The "martensite phase" can be induced by exposing the shape-memory material(s) of at least the morphable region 108 to a temperature regime below a material-specific "austenite start" transformation temperature. Reversible strain is defined as mechanically-induced strain accommodated by the innate material martensite "detwinning" and elastic deformation mechanisms of the shape-memory material(s) forming at least the morphable region 108.

In the second state of the structure 100, the shape-memory material(s) forming at least the morphable region 108 can return to the "unstrained" condition, which is achieved by transforming the shape-memory material(s) from the "martensite phase" completely to the "austenite phase." This can be accomplished by subjecting the shape-memory material(s) of at least the morphable region 108 to temperatures above the material-specific "austenite finish" transformation temperature, recovering the induced strain described in the first state. In the second state, the shape of the structure 100 can be specified by the design intent and can be set by standard shape-memory material processing techniques.

In some embodiments, thermal energy from the at least one heat source 302 can be used to cause the morphable region 108 to change shape, which may allow for passive deployment of the structure 100 once placed into operation. In other embodiments, thermal energy from the ambient environment (such as incident or reflected solar radiation) can be used to cause the morphable region 108 to change shape, which may again allow for passive deployment of the structure 100. In still other embodiments, thermal energy from at least one active source (such as a heater 120 or optical energy source coupled to the feed port 122) can be used to cause the morphable region 108 to change shape, which may allow for active deployment of the structure 100.

Although FIGS. 3A and 3B illustrate examples of shapes of the thermally-enhanced and deployable structure 100 shown in FIGS. 1A and 1B, various changes may be made to FIGS. 3A and 3B. For example, the shapes of the structure 100 shown in FIGS. 3A and 3B are for illustration only and can vary as needed or desired.

Figure 4:
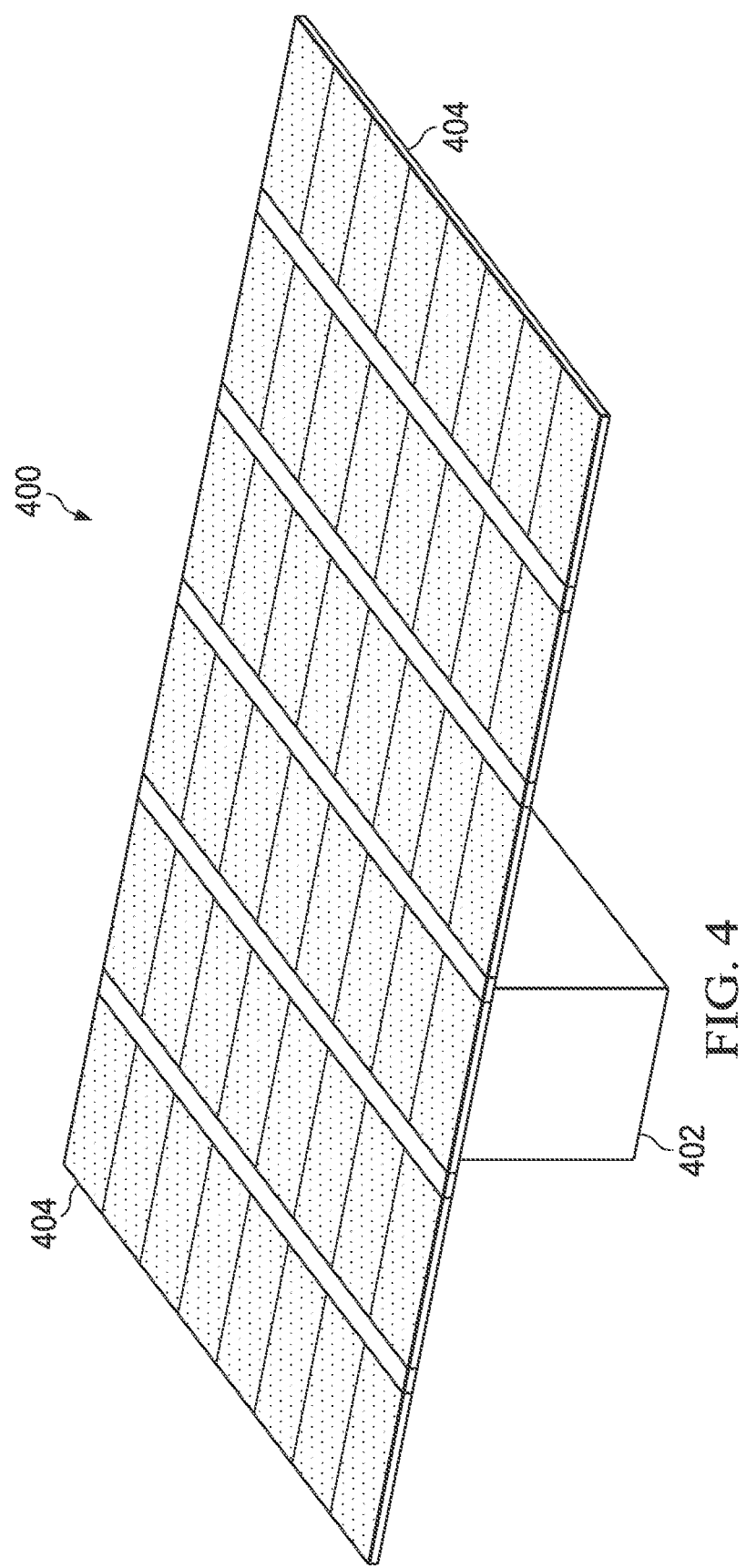
FIG. 4 illustrates an example system using thermally-enhanced structures to deploy panels in accordance with this disclosure.

FIG. 4 illustrates an example system 400 using thermally-enhanced structures to deploy panels in accordance with this disclosure. As shown in FIG. 4, the system 400 includes a satellite 402 and various deployable panels 404. In this particular example, the satellite 402 represents a three-unit cube satellite, although any other suitable satellite or other space vehicle may be used here. Also, in this particular example, the system 400 includes two sets of deployable panels 404, where the sets have different numbers of deployable panels 404. However, the system 400 may include any suitable number of deployable panels 404 in any suitable arrangement and number of sets, including a single deployable panel.

Each of the deployable panels 404 may carry or include one or more antennas, solar panels/arrays, energy storage systems, processor units, or other radio frequency (RF), power/energy, electronics, or other component(s). As described in more detail below, the deployable panels 404 can be coupled to one another and/or to the satellite 402 using shape-changeable hinges. The shape-changeable hinges are formed using one or more shape-memory alloys or other shape-memory material(s), and the shape-memory material(s) are integrated with one or more oscillating heat pipes or other thermal energy transfer mechanism(s). This allows the deployable panels 404 to be folded upon one another and stowed, such as within or in close proximity to the satellite 402. Once deployed in orbit, the hinges can be passively or actively activated (such as by using any of the techniques described above), which causes the deployable panels 404 to unfold and deploy. Essentially, each panel 404 or group of panels 404 may represent an integrated thermal-mechanical-electronic assembly.

The number of panels 404 and the hinges used to couple those panels 404 can vary as needed or desired. The number of panels 404 and the hinges used to couple the panels 404 can also affect the stowed surface area versus the deployed surface area of the system 400. In the specific example shown in FIG. 4, for instance, there are two panels 404 to the left of the satellite 402 and three panels 404 to the right of the satellite 402. Prior to deployment, these panels 404 may be folded so that they are all positioned above or otherwise nested against the satellite 402. After deployment, the panels 404 can be unfolded so that they extend away from the satellite 402.

As a particular non-limiting example of this functionality, the satellite 402 itself (without any panels 404) may be about 30 centimeters long, about 10 centimeters wide, and about 10 centimeters tall. Each of the panels 404 may be about 30 centimeters long, about 10 centimeters wide, and about 1-2 centimeters tall. Once deployed, the panels 404 may collectively have a surface area of about 30 centimeters long and about 60 centimeters wide. This effectively provides a deployed surface area to stowed surface area ratio of about 6:1, although this ratio will vary depending on the number of panels 404 and their arrangement. Also, in particular embodiments, the panels 404 may deploy and expand the surface area of the satellite 402 to a target of 1 m²/L (on-orbit surface area to stowed volume) or other target value.

Figure 5:
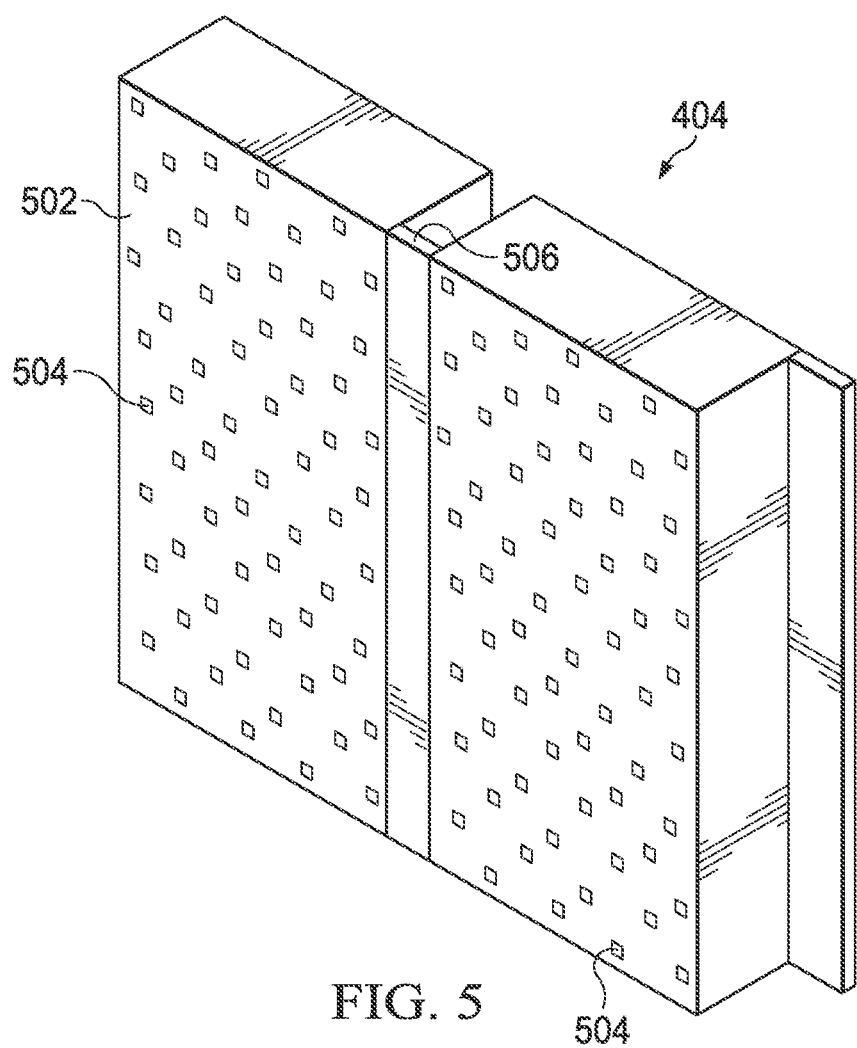
FIG. 5 illustrates an example arrangement of deployable panels in the system of FIG. 4 in accordance with this disclosure.

FIG. 5 illustrates an example arrangement of deployable panels 404 in the system 400 of FIG. 4 in accordance with this disclosure. As shown in FIG. 5, each of the panels 404 generally includes a panel substrate 502 that carries or includes one or more devices 504. The panel substrate 502 can be formed from any suitable material(s) and can be rigid, semi-rigid, or flexible. Although not shown here, one or more oscillating heat pipes or other thermal energy transfer mechanism(s) may be embedded in each panel 404 in order to distribute thermal energy within each panel 404.

Each device 504 carried by or included in the panels 404 can represent any suitable device used with the satellite 402. Example types of devices 504 may include antennas, solar panels, solar arrays, energy storage systems, processor units, or other component(s). As a particular example, at least some of the devices 504 in the panels 404 may represent gallium nitride (GaN)-based antennas or other antennas used to receive data at or transmit data from the satellite 402. Note that the number and arrangement of the devices 504 shown in FIG. 5 are for illustration only and can vary as needed or desired. Also note that different panels 404 can be used to carry different devices in any suitable arrangements.

Shape-changeable hinges 506 are used to couple panels 404 to one another and/or to the satellite 402. Each of the shape-changeable hinges 506 is formed using one or more shape-memory alloys (such as CuAlNi or NiTi alloys) or other shape-memory material(s). As described below, each of the shape-changeable hinges 506 also has one or more integrated oscillating heat pipes or other thermal energy transfer mechanism(s). Each of the hinges 506 is therefore able to change shape when heated and is able to transport thermal energy through the hinge 506 between two panels 404 or between a panel 404 and a satellite 402. Note that while a single hinge 506 is shown in FIG. 5 as being used between two panels 404 or between a panel 404 and a satellite 402, multiple hinges 506 having any suitable size(s) in any suitable arrangement(s) may be used between two panels 404 or between a panel 404 and a satellite 402.

Figure 6A:
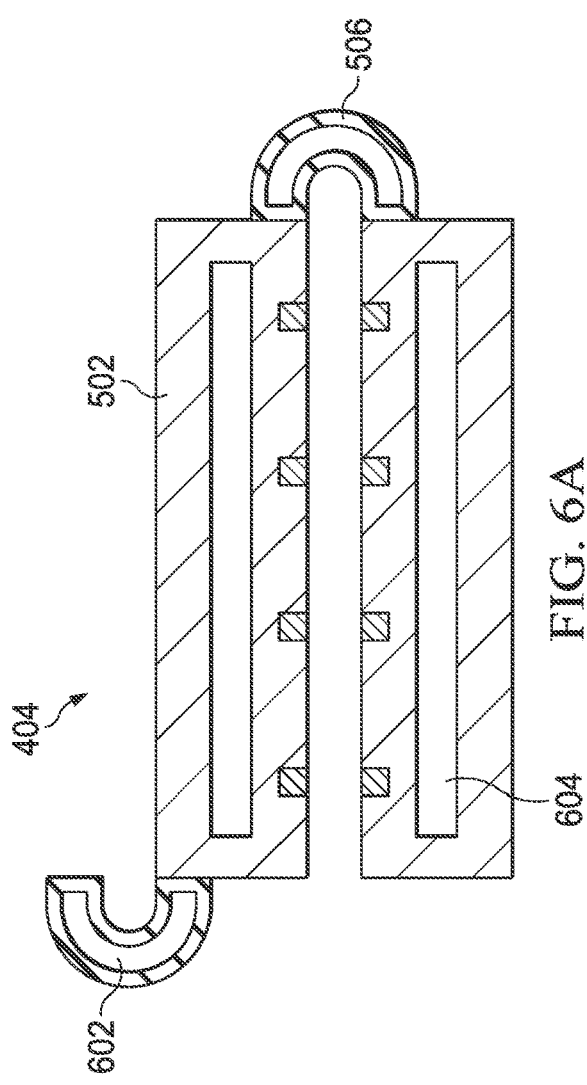
FIGS. 6A and 6B illustrate example configurations of the deployable panels of FIG. 5 in accordance with this disclosure.
Figure 6B:
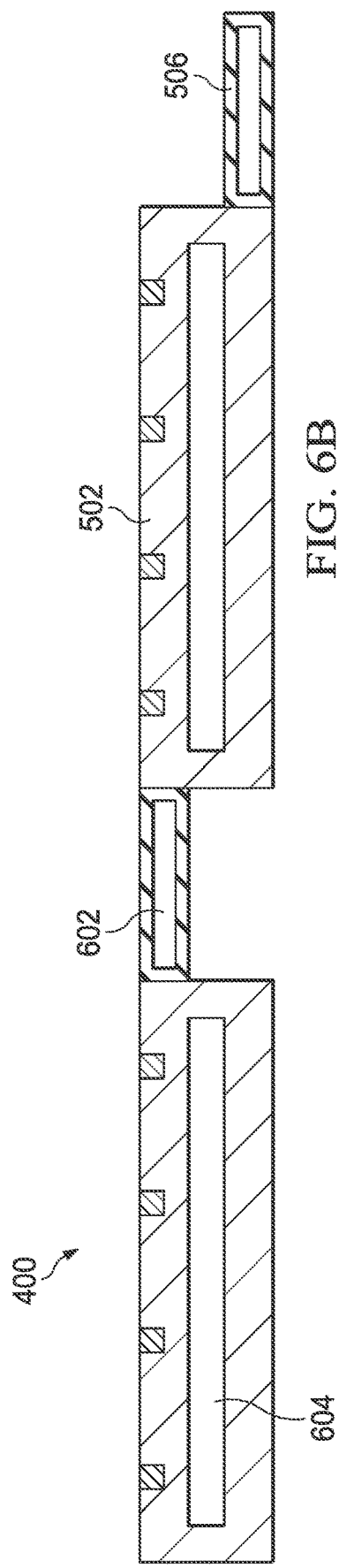

FIGS. 6A and 6B illustrate example configurations of the deployable panels 404 of FIG. 5 in accordance with this disclosure. In a first state as shown in FIG. 6A, the panels 404 are folded upon one another, and the hinges 506 are curved or bent. This state may be referred to as a stowed configuration since it is typically used prior to deployment of the satellite 402 (as it reduces the overall size of the system 400). In a second state shown in FIG. 6B, the panels 404 are unfolded, and the hinges 506 are generally straight. This state may be referred to as a deployed configuration since it is typically used after deployment of the satellite 402 (as it increases the total exposed surface area of the panels 404).

The hinges 506 in FIGS. 6A and 6B are shown as including integrated thermal energy transfer devices 602, and the panels 404 in FIGS. 6A and 6B are shown as including integrated thermal energy transfer devices 604. Each of these thermal energy transfer devices 602 and 604 may represent one or more oscillating heat pipes or any other suitable thermal energy transfer device(s), such as those described above. The thermal energy transfer devices 604 in the panels 404 help to distribute thermal energy within the panels 404 themselves. The thermal energy transfer devices 602 in the hinges 506 help to transport thermal energy along the lengths of the hinges 506 and between panels 404 or between panels 404 and the satellite 402. This allows the panels 404 to be thermally connected to adjacent panels 404 or the satellite 402. In this way, the system 400 supports both intra-panel distribution and inter-panel distribution of heat loads. By allowing the use of high-power-density higher-temperature electronics in or on the deployable panels 404, the envelope of mission profiles for the satellite 402 can be significantly increased.

Any suitable manufacturing techniques can be utilized to reduce or minimize the thickness of the panels 404 and thus increase or maximize the expansion ratio of the on-orbit surface area to stowed volume. Also, any suitable bonding techniques can be used to connect the panels 404 to the hinges 506. In addition, fluid processing of the oscillating heat pipes or other suitable thermal energy transfer devices 602 and 604 in both the panels 404 and the hinges 506 can involve any suitable manufacturing techniques to meet stringent reliability standards of the spacecraft and satellite communications industries.

Figure 7A:
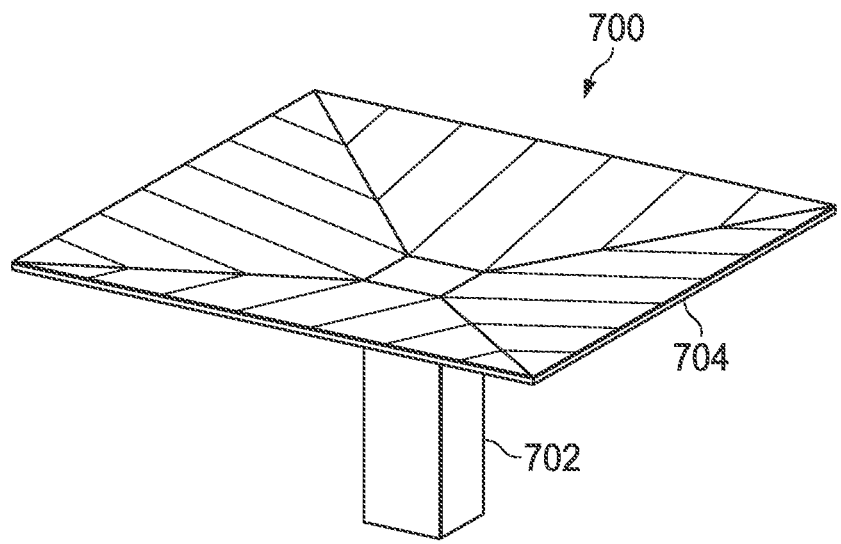
FIGS. 7A and 7B illustrate other example arrangements of deployable panels in a system in accordance with this disclosure.
Figure 7B:
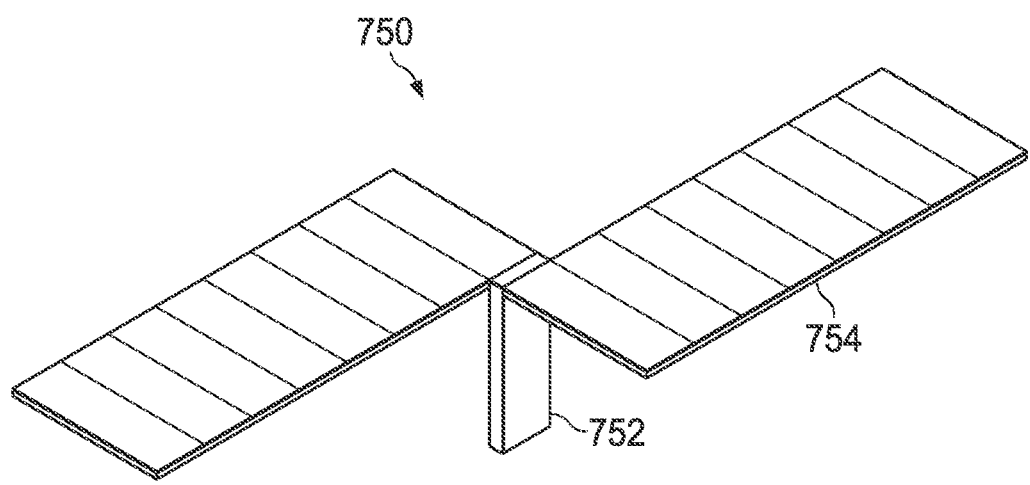

The expansion of the panels 404 from the satellite 402 shown in FIG. 4 is one example of how panels may expand post-deployment of the satellite 402. FIGS. 7A and 7B illustrate other example arrangements of deployable panels in a system in accordance with this disclosure. In FIG. 7A, for example, panels 704 are deployed from a satellite 702 and obtain an overall square or rectangular shape above the satellite 702, and the panels 704 may or may not be planar. In FIG. 7B, panels 754 are deployed from a satellite 752 and obtain two elongated rectangular shapes extending from the satellite 752, and the panels 754 again may or may not be planar. These two deployments are examples only and are merely meant to illustrate that panels can be deployed from a satellite or other space vehicle in any number of ways.

Note that the structure 100 shown in FIGS. 1A and 1B and described above may be used as the hinges 506 through suitable modifications of the structure 100. For example, the morphable region 108 of the structure 100 may be bent to allow panels to be folded upon each other and later straightened to deploy the panels (thereby providing the hinge functionality). Also, the heat input region 106 and the heat rejection region 112 of the structure 100 may be made suitably small or suitably large and can be coupled to two panels 404 or to a panel 404 and a satellite 402. Note that the region 106 or 112 that receives heat and the region 112 or 106 that rejects heat may vary depending on which of the structures connected to the hinge 506 is hotter. One or more adiabatic regions 110 may be used as needed in the hinge 506 or omitted from the hinge 506. The body 102 and the lid 104 forming each hinge 506 can have substantially equally thicknesses, with one or more oscillating heat pipes 114a-114b formed partially in the body 102 and partially in the lid 104 of each hinge 506. Approximately half of each oscillating heat pipe circuit 114a-114b can be formed in the body 102 of each hinge 506, and approximately half of each oscillating heat pipe circuit 114a-114b can be formed in the lid 104 of each hinge 506. This can place the neutral axis 204 in a desired position for each hinge 506, and the bond line interface 202 between the body 102 and the lid 104 of each hinge 506 can be aligned with the neutral axis 204 of that hinge 506. Note, however, that other arrangements (such as those shown in FIGS. 2C and 2D) may be used here.

Although FIG. 4 illustrates one example of a system 400 using thermally-enhanced structures to deploy panels 404 and FIGS. 5 through 7B illustrate related details, various changes may be made to FIGS. 4 through 7B. For example, hinges 506 may be used with any other suitable space vehicle to deploy any suitable structure(s) from the space vehicle. Also, the relative sizes and shapes of the components of the system 400 are for illustration only and can vary as needed or desired.

Figure 8:
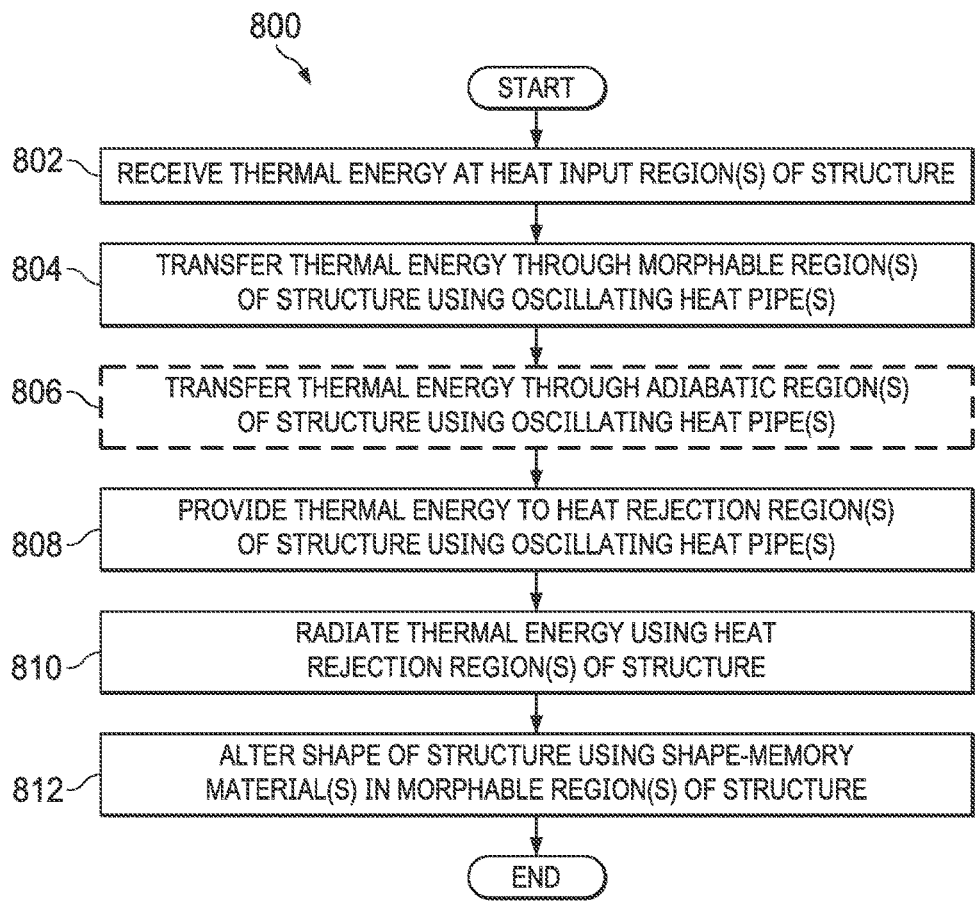
FIG. 8 illustrates an example method for using a thermally-enhanced and deployable structure in accordance with this disclosure.

FIG. 8 illustrates an example method 800 for using a thermally-enhanced and deployable structure in accordance with this disclosure. For ease of explanation, the method 800 is described as involving the use of the structure 100 described above. However, the method 800 can involve the use of any suitable structure designed in accordance with this disclosure.

As shown in FIG. 8, thermal energy is received at one or more heat input regions of a structure at step 802. This may include, for example, thermal energy from one or more heat sources 310 being received at the heat input region(s) 106 of the structure 100. The thermal energy is transferred through one or more morphable regions of the structure at step 804 and optionally through one or more adiabatic regions of the structure at step 806 using at least one thermal energy transfer device. This may include, for example, one or more oscillating heat pipe circuits 114a transferring the received thermal energy through the morphable region(s) 108 and optionally through the adiabatic region(s) 110 of the structure 100. The use of the adiabatic region(s) 110 is optional since the structure 100 may not require structural support, reinforcement, or extended heat transport using any adiabatic regions. A bond line interface 202 between the body 102 and the lid 104 of the structure 100 may be aligned with a neutral axis 204 of the structure 100 (which is defined by the positioning of the one or more oscillating heat pipe circuits 114a in the structure 100). This means that approximately half of each oscillating heat pipe circuit may be formed in the body 102, and approximately half of each oscillating heat pipe circuit may be formed in the lid 104. Of course, other arrangements (such as those described above) may also be used here.

The thermal energy is provided to one or more heat rejection regions of the structure using the at least one thermal energy transfer device at step 808. This may include, for example, the one or more oscillating heat pipe circuits 114a transferring the thermal energy to the heat rejection region(s) 112 of the structure 100. The thermal energy is radiated from the structure using the one or more heat rejection regions of the structure at step 810. This may include, for example, the heat rejection region(s) 112 of the structure 100 emitting the thermal energy into the surrounding environment.

A shape of the structure is altered using one or more shape-memory materials of the one or more morphable regions of the structure at step 812. This may include, for example, the one or more shape-memory materials of the morphable region(s) 108 being heated and changing shape to return to a programmed shape. As described above, the shape change here can be passively triggered, such as based on the thermal energy transported through the one or more oscillating heat pipe circuits 114a or based on incident or reflected solar radiation. The shape change here can also be actively triggered, such as based on thermal energy generated using the heater 120 or using energy received via the feed port 122.

Although FIG. 8 illustrates one example of a method 800 for using a thermally-enhanced and deployable structure, various changes may be made to FIG. 8. For example, while shown as a series of steps, various steps in FIG. 8 can overlap, occur in parallel, occur in a different order, or occur any number of times. As a particular example, the shape of a thermally-enhanced and deployable structure may be altered before, during, or after thermal energy is radiated from the structure. Also, the steps shown in FIG. 8 can occur with any desired number of thermally-enhanced and deployable structures (either sequentially or concurrently).

Figure 9:
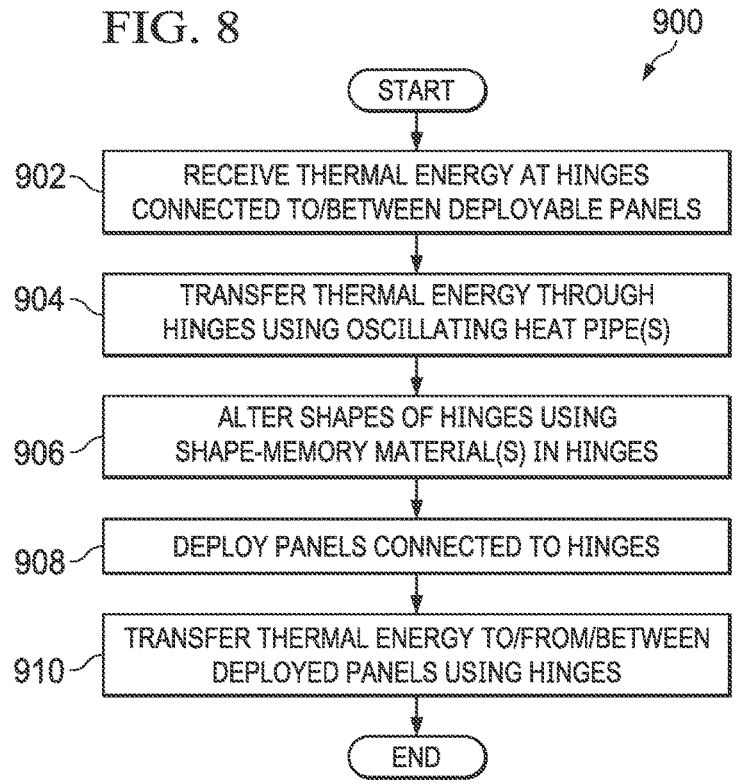
FIG. 9 illustrates an example method for using thermally-enhanced structures to deploy panels in accordance with this disclosure.

FIG. 9 illustrates an example method 900 for using thermally-enhanced structures to deploy panels in accordance with this disclosure. For ease of explanation, the method 900 is described as involving the use of the system 400 described above. However, the method 900 can involve the use of any suitable system designed in accordance with this disclosure.

As shown in FIG. 9, thermal energy is received at one or more shape-changeable hinges that are connected to/between one or more deployable panels at step 902. This may include, for example, thermal energy from one or more devices 504 being received at the hinges 506 of the system 400. Of course, the thermal energy may be received from any other suitable source(s), such as from incident or reflected solar radiation or from a heater 120 or feed port 122. The thermal energy is transported through the one or more hinges using one or more oscillating heat pipes or other thermal energy transfer devices at step 904. This may include, for example, one or more oscillating heat pipes or other thermal energy transfer devices 604 transferring the thermal energy across the hinges 506.

A shape of each hinge is altered using one or more shape-memory materials of the hinge at step 906, which deploys the panels connected to the hinges at step 908. This may include, for example, one or more shape-memory materials of each hinge 506 being heated and changing shape to return to a programmed shape. The shape change here can be passively or actively triggered in any suitable manner described above. This may also include unfolding the panels connected to the hinges 506 so that the panels achieve a desired deployed arrangement. Thermal energy can be transferred to, from, or between the deployed panels using the hinges at step 910. This may include, for example, the one or more oscillating heat pipes or other thermal energy transfer devices 604 of the hinges 506 transferring thermal energy between panels 404 and/or between panels 404 and the satellite 402. As noted above, thermal energy transfer devices 604 integrated in the panels themselves may also be used to transfer thermal energy within the panels. In this way, the thermal energy transfer devices 602 and 604 support both intra-panel and inter-panel distribution of thermal energy.

Although FIG. 9 illustrates one example of a method 900 for using thermally-enhanced structures to deploy panels, various changes may be made to FIG. 9. For example, while shown as a series of steps, various steps in FIG. 8 can overlap, occur in parallel, occur in a different order, or occur any number of times.

Note that while this disclosure has often described deployable radiators and other structures being configured or used to "radiate" thermal energy, there are various physical mechanisms that allow thermal energy to be removed from the deployable radiators and other structures. These physical mechanisms include radiation, convection, and conduction of thermal energy. Depending on the design of a deployable radiator or other structure and depending on the external environment around the structure, thermal energy may be removed from the structure via radiation, convection, or conduction (or any suitable combination thereof). The term "reject" and its derivatives encompass all of these physical mechanisms for removing thermal energy from a structure. Thus, a heat rejection region of a structure can be used to remove thermal energy from the structure via at least one of radiation, convection, and conduction.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
  a flight vehicle;
  one or more deployable panels, each deployable panel comprising multiple solar collectors disposed on the deployable panel; and
  one or more shape-changeable hinges coupled to the one or more deployable panels and the flight vehicle;
  wherein each of the one or more shape-changeable hinges comprises:
    a lid;
    a body;
    one or more morphable regions forming a first portion of the lid and the body, the one or more morphable regions comprising one or more shape-memory materials configured to cause a shape of the hinge to change;
    one or more adiabatic regions disposed adjacent to the one or more morphable regions and forming a second portion of the lid and the body, wherein the one or more adiabatic regions are coated with one or more insulative materials;
    one or more heat pipes embedded in the one or more morphable regions and the one or more adiabatic regions, the one or more heat pipes configured to receive thermal energy from the solar collectors and transfer the thermal energy at least partially along a length of the hinge, the one or more heat pipes having a shape formed by one or more first indentations formed in an inner surface of the lid and one or more second indentations formed in an inner surface of the body, the one or more first indentations and the one or more second indentations aligning with each other to form the one or more heat pipes; and wherein only the one or more morphable regions include the one or more shape-memory materials and the one or more adiabatic regions are formed from one or more other materials having high thermal conductivity.

2. The system of claim 1, wherein the one or more shape-changeable hinges are configured to:
permit the one or more deployable panels to be folded against the flight vehicle; and
unfold the one or more deployable panels to deploy the one or more deployable panels extending away from the flight vehicle.

3. The system of claim 1, wherein the system comprises multiple deployable panels and multiple hinges.

4. The system of claim 3, wherein the hinges are configured to:
permit the deployable panels to be folded upon each other; and
unfold the deployable panels to deploy the deployable panels extending away from the flight vehicle, the deployed panels having a larger exposed surface area than the folded panels.

5. The system of claim 1, wherein the one or more morphable regions are configured to change shape.

6. The system of claim 5, wherein each hinge further comprises:
one or more heat input regions configured to receive the thermal energy; and
one or more heat rejection regions configured to reject the thermal energy.

7. The system of claim 6, wherein the one or more adiabatic regions are configured to provide structural support or reinforcement while at least substantially preventing heat transfer to and from an external environment.

8. The system of claim 1, wherein the one or more heat pipes form an oscillating pattern within the one or more shape-memory materials.

9. The system of claim 1, wherein, for each hinge, a bond line interface between the body of the hinge and the lid of the hinge is aligned with a neutral axis of the hinge.

10. The system of claim 9, wherein, for each hinge, the neutral axis of the hinge equally divides a vertical thickness of the hinge.

11. The system of claim 1, wherein the flight vehicle comprises a satellite.

12. A method comprising:
receiving thermal energy at one or more shape-changeable hinges coupled to a flight vehicle and one or more deployable panels, each of the one or more deployable panels comprising multiple solar collectors disposed on the deployable panel, each of the one or more shape-changeable hinges comprising:
a lid;
a body;
one or more morphable regions forming a first portion of the lid and the body, the one or more morphable regions comprising one or more shape-memory materials configured to cause a shape of the hinge to change;
one or more adiabatic regions disposed adjacent to the one or more morphable regions and forming a second portion of the lid and the body, wherein the one or more adiabatic regions are coated with one or more insulative materials; and
one or more heat pipes embedded in the one or more morphable regions and the one or more adiabatic regions, the one or more heat pipes configured to receive thermal energy from the solar collectors and transfer the thermal energy at least partially along a length of the hinge, the one or more heat pipes having a shape formed by one or more first indentations formed in an inner surface of the lid and one or more second indentations formed in an inner surface of the body, the one or more first indentations and the one or more second indentations aligning with each other to form the one or more heat pipes;
transferring the thermal energy between different ones of the regions using the one or more heat pipes; and
rejecting the thermal energy from the one or more shape-changeable hinges into an external environment;
wherein only the one or more morphable regions include the one or more shape-memory materials and the one or more adiabatic regions are formed from one or more other materials having high thermal conductivity.

13. A method comprising:
receiving thermal energy at one or more shape-changeable hinges coupled to one or more deployable panels and a flight vehicle, each of the one or more deployable panels comprising multiple solar collectors disposed on the deployable panel, each of the one or more shape-changeable hinges comprising:
a lid;
a body;
one or more morphable regions forming a first portion of the lid and the body, the one or more morphable regions comprising one or more shape-memory materials configured to cause a shape of the hinge to change;
one or more adiabatic regions disposed adjacent to the one or more morphable regions and forming a second portion of the lid and the body, wherein the one or more adiabatic regions are coated with one or more insulative materials; and
one or more heat pipes embedded in the one or more morphable regions and the one or more adiabatic regions, the one or more heat pipes configured to receive thermal energy from the solar collectors and transfer the thermal energy at least partially along a length of the hinge, the one or more heat pipes having a shape formed by one or more first indentations formed in an inner surface of the lid and one or more second indentations formed in an inner surface of the body, the one or more first indentations and the one or more second indentations aligning with each other to form the one or more heat pipes;
transferring the thermal energy at least partially along a length of each of the one or more shape-changeable hinges using the one or more heat pipes; and
changing a shape of at least one of the one or more shape-changeable hinges using the one or more shape-memory materials in the at least one shape-changeable hinge;
wherein only the one or more morphable regions include the one or more shape-memory materials and the one or more adiabatic regions are formed from one or more other materials having high thermal conductivity.

14. The method of claim 13, further comprising:
folding the one or more deployable panels against the flight vehicle using the one or more shape-changeable hinges; and
unfolding the one or more deployable panels using the one or more shape-changeable hinges to deploy the one or more deployable panels extending away from the flight vehicle.

15. The method of claim 13, wherein:
the one or more deployable panels comprise multiple deployable panels; and
the one or more shape-changeable hinges comprise multiple shape-changeable hinges.

16. The method of claim 15, further comprising:
folding the deployable panels upon each other using the multiple shape-changeable hinges; and
unfolding the deployable panels using the multiple shape-changeable hinges to deploy the deployable panels extending away from the flight vehicle, the deployed panels having a larger exposed surface area than the folded panels.

17. The method of claim 13, wherein the one or more morphable regions are configured to change shape.

18. The method of claim 17, wherein each hinge further comprises:
one or more heat input regions configured to receive the thermal energy; and
one or more heat rejection regions configured to reject the thermal energy.

19. The method of claim 18, wherein the one or more adiabatic regions are configured to provide structural support or reinforcement while at least substantially preventing heat transfer to and from an external environment.

20. The method of claim 13, wherein the one or more heat pipes form an oscillating pattern within the one or more shape-memory materials.

21. The method of claim 13, wherein, for each hinge, a bond line interface between the body of the hinge and the lid of the hinge is aligned with a neutral axis of the hinge.

* * * * *